(12) United States Patent
Huber et al.

(10) Patent No.: US 7,690,883 B2
(45) Date of Patent: Apr. 6, 2010

(54) PIVOTING BASKET STACKER FOR DEEP-DRAWN ARTICLES

(75) Inventors: Anton Huber, Eugendorf (AT); Johannes Crepaz, Wals-Siezenheim (AT); Stefan Julinek, Rimsting (DE); Frank Scheutz, Freilassing (DE)

(73) Assignee: Kiefel GmbH, Freilassing (DE)

( * ) Notice: Subject to any disclaimer, the term of this patent is extended or adjusted under 35 U.S.C. 154(b) by 646 days.

(21) Appl. No.: 11/449,297

(22) Filed: Jun. 8, 2006

(65) Prior Publication Data

US 2006/0278654 A1 Dec. 14, 2006

(30) Foreign Application Priority Data

Jun. 9, 2005 (DE) ........................ 10 2005 026 687

(51) Int. Cl.
*B65H 29/00* (2006.01)
(52) U.S. Cl. ................. 414/790.4; 414/798.4; 414/810; 414/788.2; 414/788.5; 414/788.8; 414/790.3; 414/792.9
(58) Field of Classification Search ......... 221/175–180, 221/182; 414/331.13, 331.14, 331.16, 788.3, 414/788.6, 788.7, 789.2, 790.4, 798.4; 53/253, 53/272, 542
See application file for complete search history.

(56) References Cited

U.S. PATENT DOCUMENTS

| | | | | |
|---|---|---|---|---|
| 3,005,535 A | * | 10/1961 | Kerns et al. ................... | 198/378 |
| 6,042,360 A | * | 3/2000 | Padovani .................. | 425/403.1 |
| 6,578,344 B1 | * | 6/2003 | Fluck ........................... | 53/254 |
| 6,662,534 B2 | * | 12/2003 | Straub et al. ................... | 53/540 |
| 6,692,212 B2 | * | 2/2004 | Trautwein et al. ....... | 414/331.16 |
| 6,699,006 B2 | * | 3/2004 | Schlimgen et al. .......... | 414/801 |
| 6,851,920 B2 | * | 2/2005 | Trautwein et al. ........ | 414/798.4 |

FOREIGN PATENT DOCUMENTS

| | | |
|---|---|---|
| DE | 29608477 U1 | 9/1997 |
| EP | 1 075 023 | 2/2001 |
| EP | 1075923 A1 * | 2/2001 |
| EP | 1 201 574 A1 | 5/2002 |
| EP | 1 232 970 A1 | 8/2002 |

\* cited by examiner

*Primary Examiner*—Gregory W Adams
(74) *Attorney, Agent, or Firm*—Cohen Pontani Lieberman & Pavane LLP

(57) ABSTRACT

A device for stacking articles which are molded and stamped in a multi-impression molding and stamping tool includes a transfer device having a single gripper plate made of lightweight construction for accepting all articles ejected from one work cycle of the molding and stamping tool. A stacking station having two stacking baskets arranged on respective arms is arranged so that the baskets are pivotable about a first axis for moving a first basket of the two baskets to a transfer position and a second basket of the two baskets to an ejection position, the transfer device transferring the articles to the transfer position of the stacking station. An ejector unit and conveyor belt are arranged proximate the ejection position, each of the first and second baskets being pivotable about a second axis, perpendicular to the first axis, at the ejection position to a pivoted position. The ejector unit pushes a row of article stacks onto the conveyor at the pivoted position, the each of the first and second baskets being movable in steps to align successive rows of articles stacks with the ejector unit, and the ejector unit being movable transversely to the movement of the each of the first and second baskets.

11 Claims, 5 Drawing Sheets

PIVOTING BASKET STACKER FOR DEEP-DRAWN ARTICLES

BACKGROUND OF THE INVENTION

1. Field of the Invention

The present invention a device and a process for stacking deep-drawn or injection-molded articles which are molded and stamped out of thermoplastic film in a multi-impression molding and stamping tool and then guided by a transfer device to a stacking station and from there to an ejection unit and a transport device.

2. Description of the Related Art

A process and a device for stacking containers are known from EP 1 075 023 B1 in which the containers which have been ejected from the mold are transferred by two retainer plates to two different stacking stations in alternation. Each of the stacking stations comprises two stacking baskets which can be moved horizontally and vertically on guideways by separate drives. The two retainer plates are necessary so that the articles of one machine cycle of the molding machine can be accepted and then passed onward. This configuration entails considerable complexity, because two retainer plates and two stacking stations are required, each station being equipped with two stacking baskets and correspondingly complicated guideways and drives for the stacking baskets.

SUMMARY OF THE INVENTION

An object of the present invention is to provide a process and a device for stacking deep-drawn articles having reduced complexity over the prior art. The process and device of the present invention also allow incorporation of additional steps into the course of the known process.

The object according to the present invention is met by a process for stacking deep-drawn or injection molded articles, the articles being molded and stamped in a molding and stamping tool, the process comprising the steps of transferring, by a transfer device, finished articles of one molding and stamping cycle to a first basket of at least two stacking baskets of a stacking station, the first basket being located in a transfer position of the stacking station; forming article stacks by repeating the step of transferring; after a predetermined number of finished articles has accumulated in each of the article stacks, pivoting the stacking baskets about a first axis so that the first basket is moved to an ejection position; pivoting the first basket at the ejection position about a second axis and shifting the pivoted first basket in steps relative to an ejector at the ejection position and transferring, by the ejector unit, a row of the article stacks at each of the steps to a transport device; and shifting the ejector unit transversely to the shifting direction of the first basket at each step, if the rows of article stacks are horizontally offset.

In the present invention, therefore, the transfer device is moved at a speed such that it is able, within the scope of a machine cycle of the multi-impression mold, to bring all the articles ejected from the multi-impression mold to one of the two stacking baskets of a stacking station. Thus the complexity of the process required in the known embodiment to shift two retainer plates and two stacking baskets at each of two stacking stations is reduced by half. Because the stacking baskets are pivoted around 180°, for example, and the stacking basket now in the ejection position is pivoted and shifted again to allow ejection to proceed, the effort required with the known device for the horizontal and vertical travel of the various stacking baskets is also reduced. An especially valuable advantage of the inventive process is that, in cases where the article rows are offset vertically and horizontally, the ejection unit can be shifted transversely with respect to the shifting direction of the stacking basket, which means that stacking baskets with the previously mentioned offset may be used.

According to an embodiment of the present invention the transfer device transfers the articles to an intermediate station and the articles are then transferred to a processing station for further processing. Further processing can take the form of stamping holes in the bottoms of the articles, applying labels, imprinting the articles, etc.

The object of the invention is also met by a device for stacking articles which are molded and stamped in a multi-impression molding and stamping tool, comprising a transfer device having a single gripper plate made of lightweight construction for accepting articles ejected from the molding and stamping tool. A stacking station includes two stacking baskets arranged on respective arms such that the baskets are pivotable about a first axis for moving a first basket of the two baskets to a transfer position and a second basket of the two baskets to an ejection position, the transfer device transferring the articles to the transfer position of the stacking station. An ejector unit and conveyor belt are arranged proximate the ejection position, each of the first and second baskets being pivotable about a second axis, perpendicular to the first axis, at the ejection position to a pivoted position, whereat the ejector unit pushes a row of article stacks onto the conveyor, the each of the first and second baskets being movable in steps to align successive rows of articles stacks with the ejector unit, and the ejector unit being movable transversely to the movement of each of the first and second baskets.

Through the use of a single gripper plate, which is able, within a machine cycle of the multi-impression mold, to transfer the ejected articles to a stacking station, and through the use of pivotably mounted stacking baskets, which are guided so as to pivot around another axis when in the ejection position and to shift position to allow ejection, the structural complexity is significantly reduced in comparison with the known device. A significant advantage of the inventive device consists in particular in that the ejector unit can shift position transversely to the shifting direction of the stacking basket, which means that stacking baskets with a horizontal and vertical offset can be used.

So that the gripper plate can be moved at the necessary speed back and forth between the multi-impression mold and the stacking station or some other intermediate station, the gripper plate consists of carbon fiber-reinforced plastic and is mounted on a supporting arm, which conveys the gripper plate by means of at least one drive from the multi-impression mold to the stacking station or an intermediate station. An especially simple design is obtained by orienting the first pivot axis of the stacking station vertically. The necessary result of this is that the second pivot axis is horizontal, and the shifting direction of the stacking basket when in the ejection position is vertical.

If an intermediate station is provided, the system is laid out so that this intermediate station has a rotating table or turntable with at least two baskets to accept the articles being supplied in single layers by the gripper plate. The rotating table may be advanced at the same rate as that of the work cycle of the multi-impression mold, where a first switching station relative to a basket is the transfer station for the articles, a second switching station is a processing station for the articles, a third switching station is a transfer station to one of the two stacking baskets of the stacking station, and a fourth station is an empty station. In this embodiment, a transfer unit for transferring the articles from the revolving-table basket to a stacking basket of the stacking station is provided at the transfer station.

It is also provided according to the invention that a transfer device is provided at the third switching station to transfer the articles from the revolving-table basket to the stacking basket.

For many processing jobs, it can be advisable for the stacking baskets to be mounted detachably on the arms of the stacking station, because it then becomes possible to remove a stacking basket manually.

To increase reliability, a monitoring device to verify the emptying of the revolving-table basket can be installed upstream of the transfer station.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
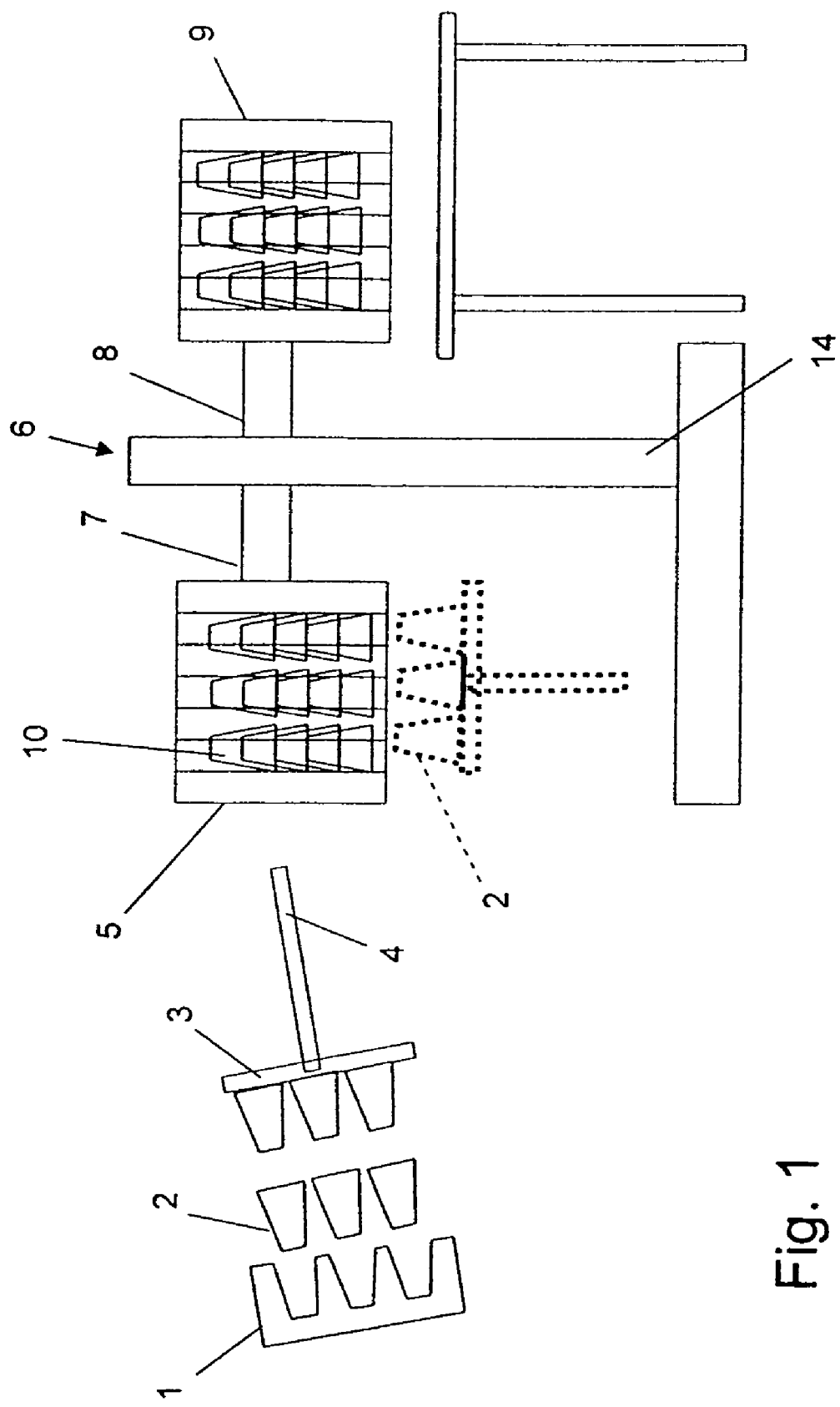
FIG. 1 is a schematic diagram of a first exemplary embodiment of a device for stacking containers.

In the embodiment according to FIG. 1, finished articles 2 are removed by a gripper plate 3 from the bottom part 1 of a thermoforming machine. This gripper plate 3, produced by a weight-saving construction technique, is attached to an arm 4, by means of which the received articles 2 are moved from the thermoforming machine to the stacking baskets 5 and 9 and by means of which the articles are loaded from underneath into one of two stacking baskets 5 and 9.

The stacking baskets 5, 9 belong to a stacking station 6, which comprises a column 14 and two supporting arms 7 and 8. The stacking baskets 5 and 9 are respectively attached to the two supporting arms 7, 8. The stacking basket 5 is shown at a loading position in FIG. 1, where the cup-like articles 2 are pushed from underneath into article stacks 10 in the stacking basket 5. After a predetermined number of articles 2 has accumulated in each article stack 10, the stacking baskets 5 and 9 are pivoted about an axis extending in the longitudinal direction of the column 14 around an angle of, for example, 180°, so that the stacking basket 5 assumes the position previously held by the stacking basket 9. After the stacking basket 5 has been pivoted into its new position, it is pivoted again, around a second axis, which extends in the longitudinal direction of the arm 7 (see FIG. 5). An ejector unit 11 with ejector rods 12 is arranged at the pivoted location of stacking basket 5, i.e., the position of stacking basket 9 in FIG. 1. The ejector rods 12 are arranged so that they correspond with the holding locations of the article stacks 10 in the stacking basket 5. These rods 12 are designed to eject the individual article stacks 10 as will be described below.

Figure 4:
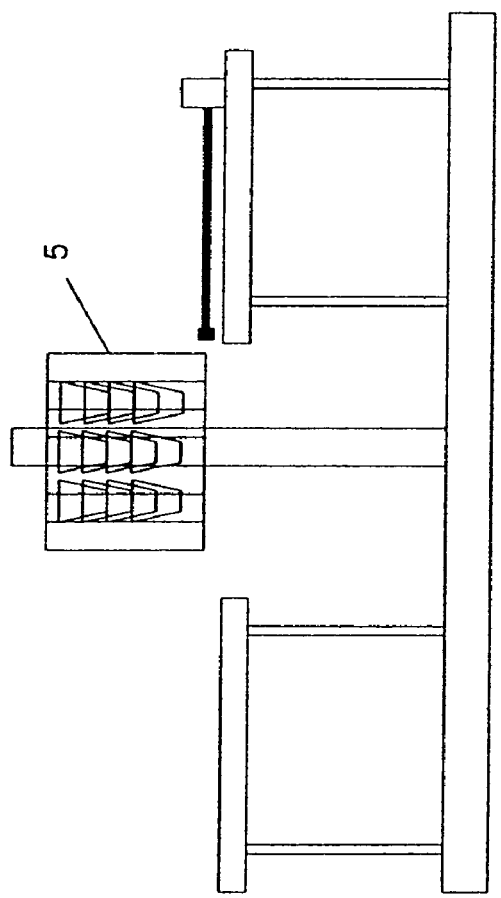
FIG. 4 is an end view of the device of FIG. 3 in the direction of arrow IV with a stacking basket in a first position.
Figure 5:
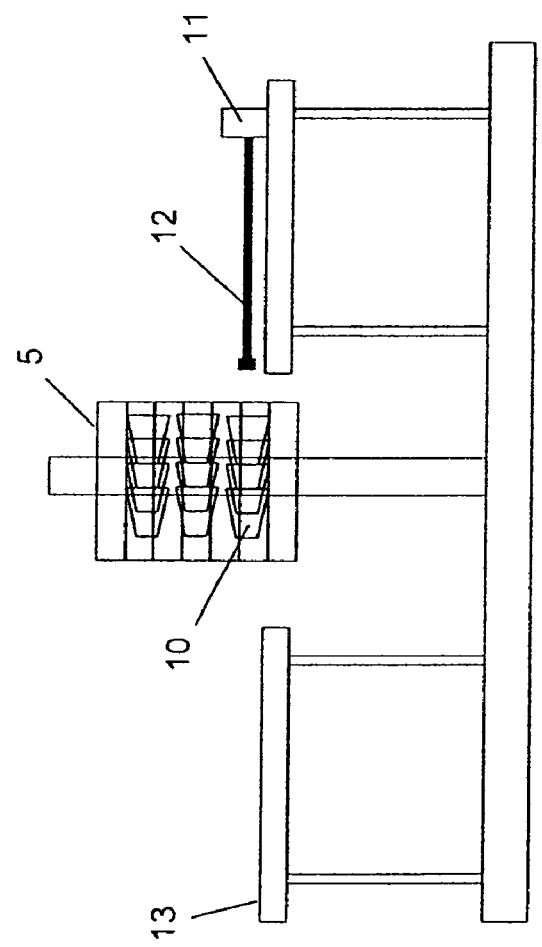
FIG. 5 is an end view of the device corresponding to FIG. 4 with the stacking basket in another position.

FIG. 4 shows the stacking basket 5 after it has been pivoted 180° from the position shown in FIG. 1 about the first pivoting axis. FIG. 5 shows the position of the stacking basket 5 after it has been pivoted about the second pivoting axis which extends in the longitudinal direction of the supporting arm 7. In the position shown in FIG. 5, the ejector unit 11 with ejector rods 12 can push the lowermost row of article stacks 10 onto a conveyor belt 13 installed behind the basket 5.

Figure 6:
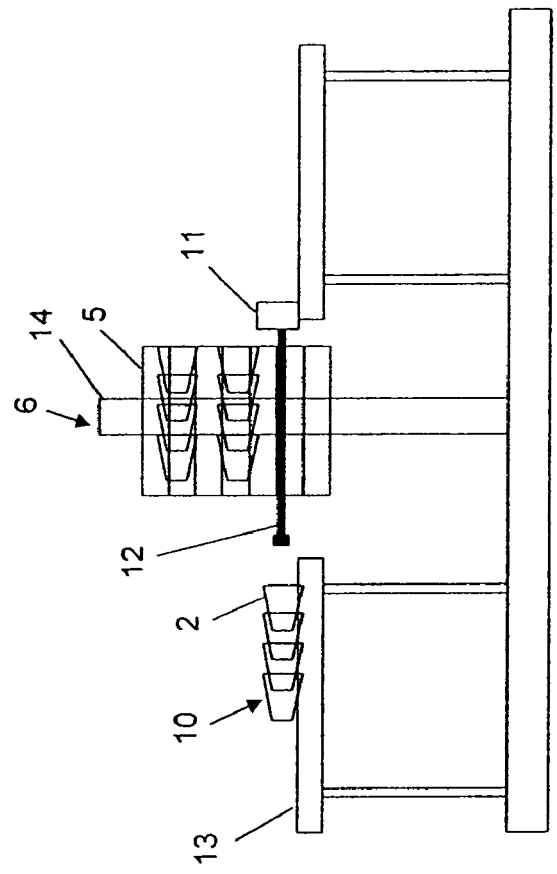
FIG. 6 is an end view of the device corresponding to FIG. 5 with a first ejected row of stacked articles.

FIG. 6 shows the situation in which the lowermost row of article stacks 10 has been pushed all the way out by the ejector rod 12. The pushed-out article stacks 10 thus arrive on the conveyor belt 13.

Figure 7:
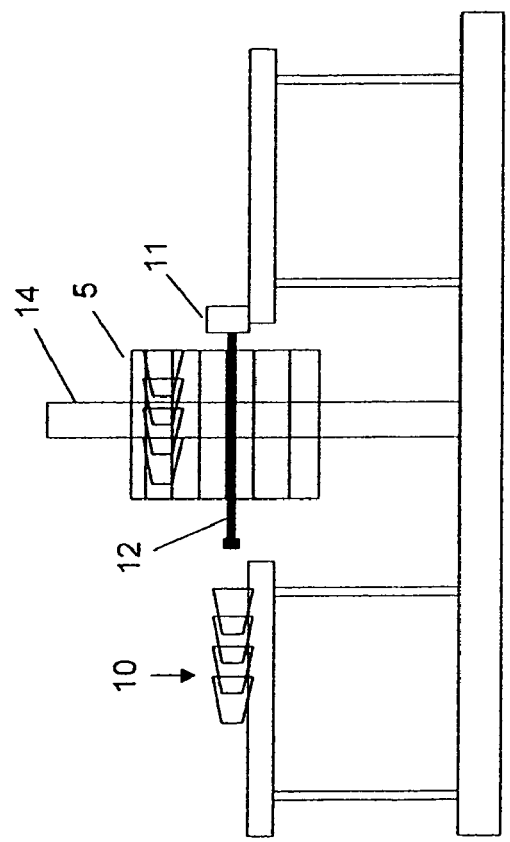
FIG. 7 shows a view corresponding to FIG. 6 with the stacking basket in another position.

The stacking basket 5 can be moved in the vertical direction of the column 14, which caries the arms 7 and 8 to which the stacking baskets 5 and 9 are attached, so that the next-higher row of article stacks 10 can be ejected by the ejector rods 12. This type of movement is illustrated in FIGS. 6-7.

Figure 2:
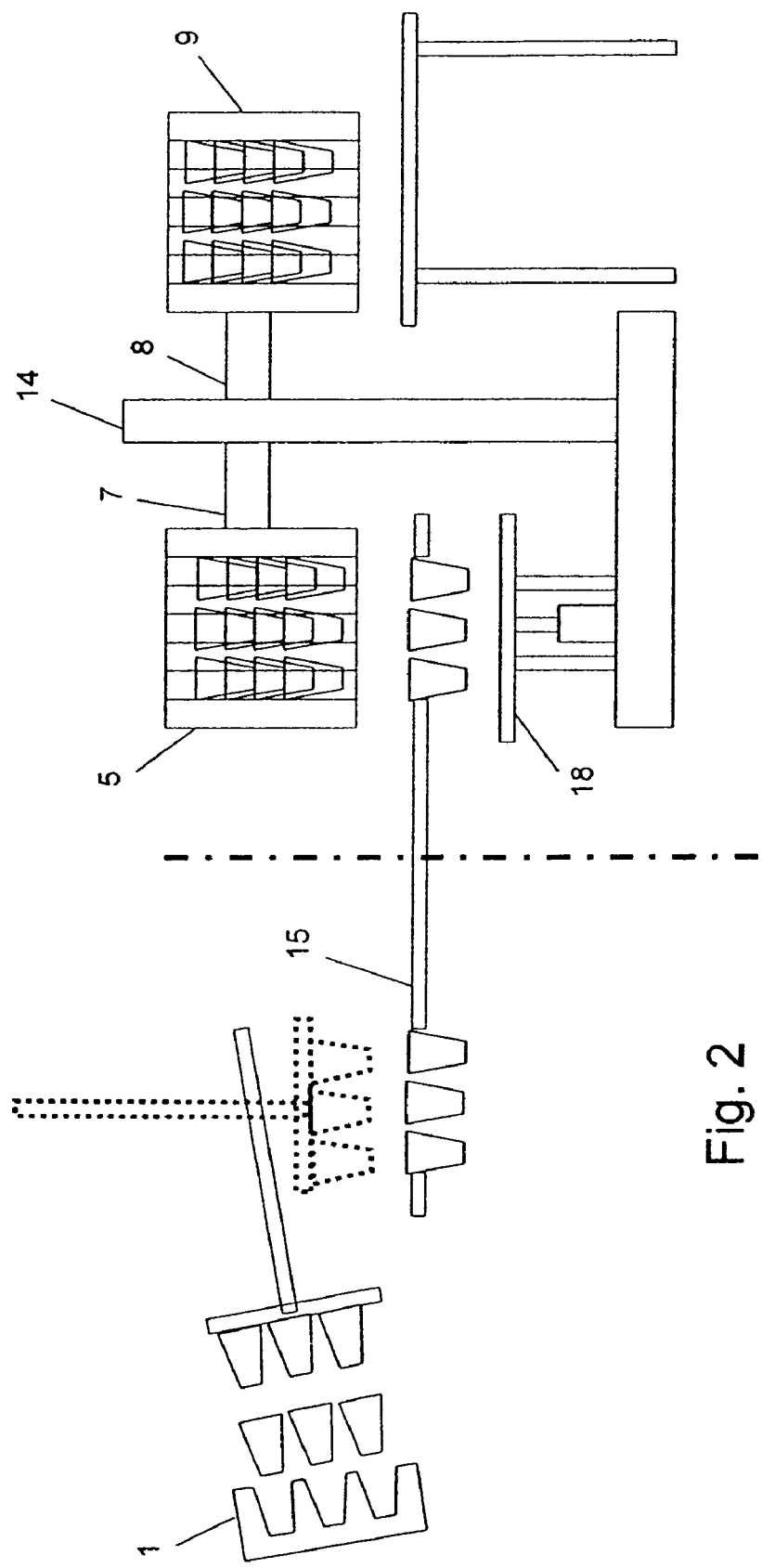
FIG. 2 is a schematic diagram of another embodiment of a device for stacking containers.
Figure 3:
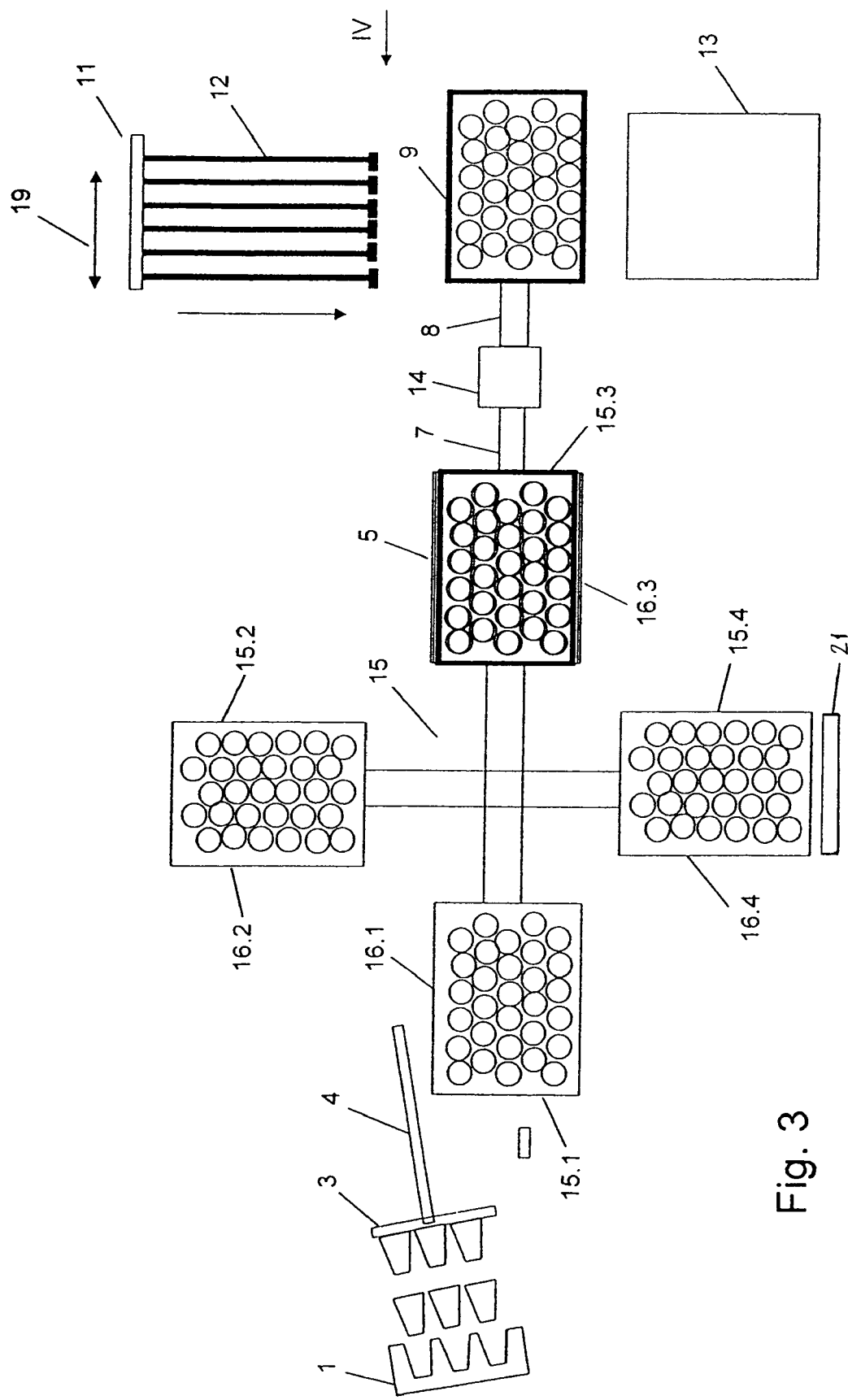
FIG. 3 is a schematic plan view from above the device according to FIG. 2.

FIG. 2 shows a further embodiment of the overall device. Here, in comparison with FIG. 1, an intermediate station is shown which comprises a rotating table 15. As can be seen in FIG. 3, the rotating table 15 has four switching stations 16.1-16.4. Although four switching stations are shown, the rotating table 15 may have two or more switching stations. The switching station 16.1 serves to accept a layer of articles 2 coming from the multi-impression mold (see FIG. 2). The rotating table 15 or turntable has revolving-table baskets 15.1-15.4, which are advanced in sequence from one switching station to the next at the same rate as that of the work cycle of the multi-impression molding machine. That is, each basket 15.1-15.4 is arranged to receive all the articles produced by one work cycle of the molding machine when that basket is located at switching station 16.1. After a revolving-table basket 15.1 has accepted a layer of articles 2 at the switching station 16.1, it is advanced to the switching station 16.2, where the articles 2 may be processed. For example, holes can be punched in the bottoms, labels applied, and or imprinting of the articles may occur. After the next advance of the rotating table 15, the basket 15.1 arrives at the switching station 16.3 (see FIG. 2), where the articles are transferred to one of the two stacking baskets 5 and 9. Then the empty revolving-table basket 15.1 is advanced from the position 16.3 to the empty switching station 16.4, from which it is advanced again to the switching station 16.1, where it can then accept new articles again. A monitor 21 may be arranged at the empty switching station 16.4 to verify that the basket 15.1 has been emptied. Instead of being arranged at the empty switching station, the monitor 21 may alternatively be arranged at the third switching station 16.3.

When the revolving-table basket 15.1 is located in switching position 16.3, the individual article layers are pushed upward into the stacking basket 5 by a transfer device 18. As soon as a certain number of articles 2 has accumulated in the stacking basket 5, the baskets are pivoted around the vertical axis of the column 14, as a result of which the stacking basket 5 arrives in the position proximate the ejector unit 11, as already explained above. As indicated by the double arrow 19 in FIG. 3, the ejector unit 11 can be shifted horizontally to align the rods 12 with the row of articles 2 to be ejected.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A process for stacking deep-drawn or injection molded articles, the articles being molded and stamped in a molding and stamping tool, the process comprising:

transferring, by a transfer device, finished articles of one molding and stamping cycle of the molding and stamping tool to a first basket of at least two stacking baskets in a stacking station, the first basket being vertically oriented in a transfer position of the stacking station;

forming article stacks in the first basket by repeating the step of transferring;

after a predetermined number of finished articles has accumulated in each of the article stacks, pivoting the stacking baskets about a first vertical axis so that the first basket is moved to an ejection position;

pivoting the first basket at the ejection position about a second horizontal axis perpendicular to the first vertical axis, wherein the first basket is horizontally oriented, moving the pivoted first basket in steps relative to an ejector unit at the ejection position and transferring, by the ejector unit, a row of the article stacks at each of the steps to a transport device; and shifting the ejector unit transversely to the moving direction of the first basket at each step, if the rows of article stacks are horizontally offset.

2. The process of claim 1, wherein said step of transferring finished articles further comprises transferring the finished articles to an intermediate station and transferring the finished articles to a processing station for further processing, before transferring the finished articles to the stacking baskets.

3. The process of claim 2, wherein the further processing includes one of stamping holes in the bottoms of the articles, applying labels to the articles, and imprinting the articles.

4. The process claim 2, wherein said processed articles are transferred to the first stacking basket.

5. A device for stacking articles which are molded and stamped in a multi-impression molding and stamping tool, comprising:

a transfer device having a single gripper plate made of lightweight construction configured to accept articles ejected from one work cycle of the molding and stamping tool;

a stacking station having two stacking baskets pivotably affixed about a first vertical axis on respective arms configured to move a first basket of the two baskets to a transfer position and a second basket of the two baskets to an ejection position, the transfer device transferring the articles to the transfer position of the stacking station;

an ejector unit and conveyor belt arranged proximate said ejection position, each of said first and second baskets configured to pivot about a second horizontal axis, perpendicular to said first vertical axis, at said ejection position to a pivoted position wherein the respective basket is horizontally oriented, whereat said ejector unit pushes a row of article stacks onto said conveyor, said each of said first and second baskets being movable in steps to align successive rows of articles stacks with said ejector unit, and said ejector unit being movable transversely to the movement of said each of said first and second baskets.

6. The device of claim 5, wherein said gripper plate is made of a material consisting of carbon fiber-reinforced plastic, said transfer device further comprises a supporting arm which conveys said gripper plate from the multi-impression mold to one of said stacking station or an intermediate station.

7. The device of claim 6, further comprising the intermediate station having a rotating table or turntable with at least two baskets to receive the articles being supplied in single layers by said gripper plate, the rotating table being advanced between successive switching stations at each work cycle of the multi-impression mold, the switching stations including a first switching station comprising a transfer station for receiving the articles, a second switching station comprising a processing station for the articles, a third switching station comprising a transfer station to one of the two stacking baskets of said stacking station, and a fourth station comprising an empty station; and a transfer unit arranged at said transfer station for transferring the articles from the rotating table to one of the first and second stacking baskets of said stacking station.

8. The device of claim 7, wherein said transfer unit is provided at said third switching station.

9. The device of claim 7, further comprising a monitoring device for verifying the emptying of the rotating-table baskets installed upstream of said transfer station.

10. The process of claim 5, wherein said first pivot axis of said stacking station is oriented vertically.

11. The device according to claim 5, wherein said stacking baskets are mounted detachably on said arms of said stacking station.

* * * * *